United States Patent
Cornelius et al.

(10) Patent No.: US 10,462,417 B2
(45) Date of Patent: Oct. 29, 2019

(54) METHODS AND APPARATUS FOR REDUCING ELECTROMAGNETIC INTERFERENCE RESULTANT FROM DATA TRANSMISSION OVER A HIGH-SPEED AUDIO/VISUAL INTERFACE

(71) Applicant: Apple Inc., Cupertino, CA (US)

(72) Inventors: William Cornelius, Cupertino, CA (US); In Jae Chung, Cupertino, CA (US); Bryan Follis, Cupertino, CA (US); Pierre Michael, Cupertino, CA (US); Kofi Boateng, Cupertino, CA (US); Jongbae Park, Cupertino, CA (US); Joseph Karaszewski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 15/692,966

(22) Filed: Aug. 31, 2017

(65) Prior Publication Data
US 2019/0068918 A1  Feb. 28, 2019

(51) Int. Cl.
| H04N 7/10 | (2006.01) |
| H04N 7/015 | (2006.01) |
| H04N 21/4363 | (2011.01) |
| H04B 3/02 | (2006.01) |
| H04B 3/14 | (2006.01) |

(Continued)

(52) U.S. Cl.
CPC .......... *H04N 7/102* (2013.01); *G09G 3/2096* (2013.01); *G09G 5/006* (2013.01); *H04B 3/02* (2013.01); *H04B 3/14* (2013.01); *H04N 7/015* (2013.01); *H04N 7/108* (2013.01); *H04N 21/43635* (2013.01); *G09G 2330/06* (2013.01); *G09G 2370/12* (2013.01)

(58) Field of Classification Search
None
See application file for complete search history.

(56) References Cited

U.S. PATENT DOCUMENTS

| 4,984,146 A * | 1/1991 | Black | H02M 1/44 363/126 |
| 6,205,505 B1 * | 3/2001 | Jau | G06F 13/409 710/100 |

(Continued)

*Primary Examiner* — Alexander Q Huerta
(74) *Attorney, Agent, or Firm* — Gazdzinski & Associates, PC

(57) ABSTRACT

Methods and apparatus for reducing electromagnetic interference resultant from data transmission over a high-speed audio/visual interface. In one embodiment, an HDMI source device is disclosed. The HDMI source device includes a wireless interface and an HDMI interface coupled with an active filter circuit topology. The active filter circuit topology includes a pair of differential signal lanes; a passive filter circuit disposed within each of the pair of differential signal lanes; a plurality of active filter circuits, with at least a first active filter circuit disposed on one side of the passive filter circuit and at least a second active filter circuit disposed on the other side of the passive filter circuit; a plurality of diodes, with each of the plurality of active filter circuits coupled with a respective diode; and switching logic coupled with the plurality of diodes. Methods of operating the HDMI source device and HDMI systems are also disclosed.

20 Claims, 10 Drawing Sheets

(51) Int. Cl.
*G09G 3/20* (2006.01)
*G09G 5/00* (2006.01)

(56) References Cited

U.S. PATENT DOCUMENTS

| | | | | | |
|---|---|---|---|---|---|
| 6,462,435 | B1* | 10/2002 | Covaro | | H01R 31/065 307/89 |
| 7,443,229 | B1* | 10/2008 | Vinciarelli | | H02M 1/32 327/531 |
| 2001/0045863 | A1* | 11/2001 | Pelly | | H02M 1/12 327/552 |
| 2003/0132926 | A1* | 7/2003 | Lee | | G09G 3/3611 345/204 |
| 2003/0210563 | A1* | 11/2003 | Takahashi | | H02M 1/12 363/44 |
| 2004/0141275 | A1* | 7/2004 | Athari | | H02M 1/15 361/118 |
| 2004/0246751 | A1* | 12/2004 | Honda | | H02M 1/12 363/39 |
| 2009/0290392 | A1* | 11/2009 | Ganev | | H02M 1/44 363/39 |
| 2010/0019862 | A1* | 1/2010 | Feng | | H02M 1/126 333/181 |
| 2012/0093212 | A1* | 4/2012 | Oh | | G09G 5/006 375/224 |
| 2012/0274857 | A1* | 11/2012 | Maxwell | | H04L 12/12 348/720 |
| 2013/0195218 | A1* | 8/2013 | Whitby-Strevens | ... | H04B 15/00 375/296 |
| 2014/0063872 | A1* | 3/2014 | Hamza | | H02M 1/44 363/39 |
| 2014/0092211 | A1* | 4/2014 | Nakajima | | G09G 5/006 348/43 |
| 2014/0254730 | A1* | 9/2014 | Kim | | H04B 1/10 375/346 |
| 2014/0292401 | A1* | 10/2014 | Shen | | H03H 11/1217 327/556 |
| 2016/0345055 | A1* | 11/2016 | Kim | | H04N 21/43635 |
| 2017/0222467 | A1* | 8/2017 | Jeong | | H02J 7/025 |
| 2018/0048223 | A1* | 2/2018 | Pei | | H02J 3/01 |

* cited by examiner

METHODS AND APPARATUS FOR REDUCING ELECTROMAGNETIC INTERFERENCE RESULTANT FROM DATA TRANSMISSION OVER A HIGH-SPEED AUDIO/VISUAL INTERFACE

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The disclosure relates generally to the field of audio/visual (A/V) consumer electronics devices. More particularly, in one exemplary aspect, the disclosure is directed to methods and apparatus for reducing electromagnetic interference (EMI) emissions over a high-speed A/V interface.

DESCRIPTION OF RELATED TECHNOLOGY

High-Definition Multimedia Interface (HDMI) is an exemplary digital display interface standard for connecting multimedia data sources to multimedia display devices. Existing HDMI source/display devices generally support video data, audio data, control data, and optionally network connections. Historically, HDMI was developed to improve audio visual (A/V) interface capabilities while still supporting legacy interfaces (e.g., Digital Visual Interface (DVI)). More recent incarnations of the HDMI standard (e.g., HDMI 2.0) allow for improved throughput over their Transition-Minimized Differential Signaling (TMDS) data channels. However, legacy signaling standards were designed around assumptions that are no longer accurate for many modern consumer electronics devices. Specifically, aggressive device form factors (e.g., those which are very spatially compact, contain metal casings or other components, etc.) that incorporate, inter alia, HDMI A/V interfaces may result in excessive spurious EMI emissions which may degrade the performance of, for example, co-located wireless air interfaces which are now commonly used in conjunction with, inter alia, HDMI interfaces on these aggressive form factor devices.

Accordingly, improved methods and apparatus are needed to mitigate these spurious EMI emissions, in particular with the variety of bit rates supported in for example, existing and future incarnations of HDMI. More generally, apparatus and methods are needed for mitigating EMI interference in many common frequency bands utilized by wireless air interfaces including, without limitation, the 2.4 GHz and 5 GHz wireless bands.

SUMMARY

The present disclosure satisfies the foregoing needs by providing, inter alia, improved methods and apparatus for reducing EMI emissions resultant from high speed data transmission over, for example, an HDMI interface.

In a first aspect, a method of operating a source device in an HDMI system is disclosed. In one embodiment, the method includes receiving an operating mode for a sink device coupled to the source device; and determining if a first operating mode is supported by the sink device, and if so, turning off one or more diodes present in an active filter circuit, otherwise if the first operating mode is not supported, turning on the one or more diodes present in the active filter circuit.

In one variant, when the first operating mode is supported by the sink device and the method further includes detecting a different operating mode of operation and turning on the one or more diodes present in the active filter circuit.

In another variant, when the first operating mode is not supported by the sink device, the method further includes detecting a different operating mode of operation and turning off the one or more diodes present in the active filter circuit.

In yet another variant, the turning on the one or more diodes includes enabling active filter circuitry present within the active filter circuit.

In yet another variant, the turning off the one or more diodes includes disabling active filter circuitry present within the active filter circuit.

In a second aspect, an HDMI source device is disclosed. In one embodiment, the HDMI source device includes a wireless interface; and an HDMI interface coupled with an active filter circuit topology. The active filter circuit topology includes a pair of differential signal lanes; a passive filter circuit disposed within each of the pair of differential signal lanes; a plurality of active filter circuits, with at least a first active filter circuit disposed on one side of the passive filter circuit and at least a second active filter circuit disposed on the other side of the passive filter circuit; a plurality of diodes, with each of the plurality of active filter circuits coupled with a respective diode; and switching logic coupled with the plurality of diodes.

In one variant, the passive filter circuit includes a π-network circuit topology.

In another variant, each of the plurality of active filter circuits includes a capacitor.

In yet another variant, the switching logic is configured to receive operating mode data from a sink device coupled to the HDMI source device, the switching logic further configured to selectively apply a voltage to the plurality of diodes dependent upon the received operating mode data.

In yet another variant, the passive filter circuit includes a length of a printed circuit board trace.

In yet another variant, each of the plurality of active filter circuits includes a capacitor coupled in series with an inductor.

In yet another variant, the switching logic is configured to receive operating mode data from a sink device coupled to the HDMI source device, the switching logic further configured to selectively apply a voltage to the plurality of diodes dependent upon the received operating mode data.

In yet another variant, an inductive value differs between the at least the first active filter circuit and the at least the second active filter circuit.

In yet another variant, each of the plurality of active filter circuits includes a capacitor with a capacitance value that differs between the at least the first active filter circuit and the at least the second active filter circuit.

In yet another variant, the switching logic is configured to receive operating mode data from a sink device coupled to the HDMI source device, the switching logic further configured to selectively apply a voltage to the plurality of diodes dependent upon the received operating mode data.

In a third aspect, an HDMI system is disclosed. In one embodiment, the HDMI system includes a sink device; and a source device coupled to the sink device via an HDMI cable. The source device includes an active filter circuit, the active filter circuit configured to alter a signal conditioning function dependent upon operating mode signaling provided by the sink device to the source device.

In one variant, the operating mode signaling includes an Extended Display Identification Data (EDID) data structure that is transmitted across the HDMI cable.

In another variant, the active filter circuit further includes a plurality of diodes, the plurality of diodes are configured to be selectively activated via switching logic, the selective activation being dependent upon the EDID data structure that is transmitted across the HDMI cable.

In yet another variant, the active filter circuit includes: a pair of differential signal lanes; a passive filter circuit disposed within each of the pair of differential signal lanes; a plurality of active filter circuits, with at least a first active filter circuit disposed on one side of the passive filter circuit and at least a second active filter circuit disposed on the other side of the passive filter circuit; a plurality of diodes, with each of the plurality of active filter circuits coupled with a respective diode; and switching logic coupled with the plurality of diodes.

In yet another variant, the switching logic is configured to receive the operating mode signaling from the sink device, the switching logic further configured to selectively apply a voltage to the plurality of diodes dependent upon the received operating mode signaling.

In a fourth aspect, an active filter circuit topology is disclosed. In one embodiment, the active filter circuit topology includes a pair of differential signal lanes; a passive filter circuit disposed within each of the pair of differential signal lanes; a plurality of active filter circuits, with at least a first active filter circuit disposed on one side of the passive filter circuit and at least a second active filter circuit disposed on the other side of the passive filter circuit; a plurality of diodes, with each of the plurality of active filter circuits coupled with a respective diode; and switching logic coupled with the plurality of diodes.

In one variant, the passive filter circuit includes a π-network circuit topology.

In another variant, each of the plurality of active filter circuits includes a capacitor.

In yet another variant, the switching logic is configured to receive operating mode data from a sink device coupled to an HDMI source device, the switching logic further configured to selectively apply a voltage to the plurality of diodes dependent upon the received operating mode data.

In yet another variant, the passive filter circuit includes a length of a printed circuit board trace.

In yet another variant, each of the plurality of active filter circuits includes a capacitor coupled in series with an inductor.

In yet another variant, the switching logic is configured to receive operating mode data from a sink device coupled to an HDMI source device, the switching logic further configured to selectively apply a voltage to the plurality of diodes dependent upon the received operating mode data.

In yet another variant, an inductive value differs between the at least the first active filter circuit and the at least the second active filter circuit.

In yet another variant, each of the plurality of active filter circuits includes a capacitor with a capacitance value that differs between the at least the first active filter circuit and the at least the second active filter circuit.

In yet another variant, the switching logic is configured to receive operating mode data from a sink device coupled to the HDMI source device, the switching logic further configured to selectively apply a voltage to the plurality of diodes dependent upon the received operating mode data.

Other features and advantages of the present disclosure will immediately be recognized by persons of ordinary skill in the art with reference to the attached drawings and detailed description of exemplary embodiments as given below.

Figure 1:
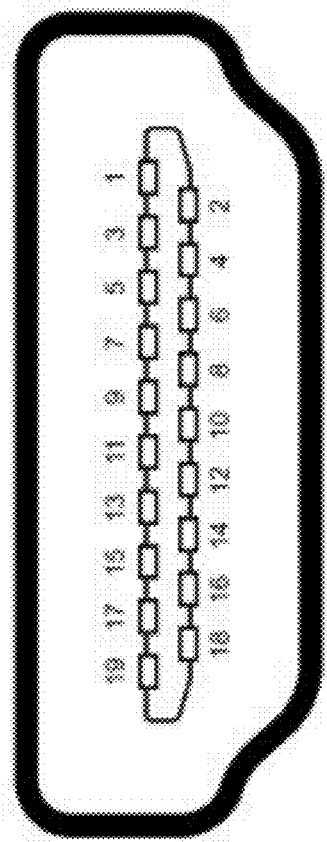
FIG. 1 is a graphical representation illustrating an exemplary prior art HDMI type A receptacle in accordance with the principles of the present disclosure.

All Figures © Copyright 2017 Apple Inc. All rights reserved.

DETAILED DESCRIPTION

Reference is now made to the drawings, wherein like numerals refer to like parts throughout.
Detailed Description of Exemplary Embodiments Exemplary embodiments are now described in detail. While these embodiments are primarily discussed in the context of HDMI, it would be readily appreciated by one of ordinary skill given the contents of the present disclosure that the disclosure is not so limited. In fact, the principles of the present disclosure may be readily adapted to any number of transmission mediums (e.g., data buses) for which the emissions caused by various transmission bit rates may result in deleterious EMI emissions that may affect, for example, co-located wireless interfaces.

Moreover, while primarily discussed in the context of choosing between two different data rates and/or two different frame resolutions, it would be readily apparent to one of ordinary skill given the contents of the present disclosure that implementations described herein may be readily adapted for optimization of three (or more) different data rates and/or three (or more) different frame resolutions. These and other variants would be readily apparent to one of ordinary skill given the contents of the present disclosure.

HDMI Technology

Extant consumer electronics devices that integrate HDMI are known to introduce issues with respect to 2.4 GHz and 5 GHz wireless band desensitization due to emissions from the TMDS lanes of the HDMI bus within poorly shielded/constructed HDMI cables. For example, significant 2.4 GHz/5 GHz desensitization may result in significantly reduced Wi-Fi and/or Bluetooth® accessory performance resulting in a poor user experience. Such an issue may pose major challenges for system integrators as often times one cannot control the quality of the HDMI cable that an end customer may ultimately choose. This problem is further exacerbated by the inundation of low-cost (and lesser quality) HDMI cables that are readily available in the market place.

For example, for consumer electronic devices that integrate HDMI 1.4b, the use of passive filter solutions on the TMDS clock and data pairs that target roll-off around 1.5 GHz to mitigate, for example, 2.4 GHz and 5 GHz EMI emissions have been effective at mitigating common mode and differential mode emissions. Such solutions have been effective for products that support, for example, 1080p 60 Hz 8bpc 4:4:4 modes of operation as their data rates operate up to approximately 1.485 Gbps per lane. More recently, HDMI 2.0b introduced video formats that support 2160p 60 Hz 8bpc 4:4:4 modes of operation which results in a data rate operative up to 6 Gbps per lane. Moreover, HDMI source devices that operate in accordance with HDMI 2.0b are required to operate with legacy HDMI sink devices (e.g., display monitors). However, these increased data rates are oftentimes not suitable for use with common HDMI systems in which there are, for example, co-located wireless interfaces. In particular, spurious EMI emissions may cause deleterious performance for these co-located wireless interfaces when using, for example, lesser quality HDMI cables.

Solutions are now described which may effectively reduce spurious EMI resultant from, inter alia, the use of poor HDMI cabling with HDMI 2.0b source devices. Moreover, such solutions may include "active circuitry" which enables consumer electronic devices to effectively target a filtering solution dependent upon, for example, reading information from a sink device (via e.g., the Display Data Channel (DDC)) in order to learn what A/V formats the sink device may support.

Apparatus

Referring now to FIG. 1, an exemplary prior art HDMI type A receptacle 100 is shown. The HDMI receptacle 100 illustrated includes nineteen (19) pins. Pins 1 and 3 are TMDS data channel two pins, with pin 2 being a shielding pin for TMDS data channel two. Pins 4 and 6 are TMDS data channel one pins, with pin 5 being a shielding pin for TMDS data channel one. Pins 7 and 9 are TMDS data channel zero pins, with pin 8 being a shielding pin for TMDS data channel zero. Pins 10 and 12 are TMDS clock channel pins, with pin 11 being a shielding pin for the TMDS clock channel. Pin 13 is the Consumer Electronic Control (CEC); pin 14 may be an HDMI Ethernet and Audio Return Channel (HEAC) which may support a high-speed bidirectional data communication link (e.g., and HDMI Ethernet Channel (HEC)) and an Audio Return Channel (ARC); pins 15 and 16 may be used for the Display Data Channel (DDC) with pin 15 being an inter-integrated circuit ($I^2C$) serial clock channel for DDC and pin 16 being an $I^2C$ serial data channel for DDC. Pin 17 is a grounding pin for the DDC, CEC, ARC, and HEC channels. Pin 18 is a voltage pin (e.g., +5V), while pin 19 is a Hot Plug Detect (HPD) channel. The following discussion will be cast primarily in terms of filtering for the TMDS data channels 0, 1, and 2.

Figure 2A:
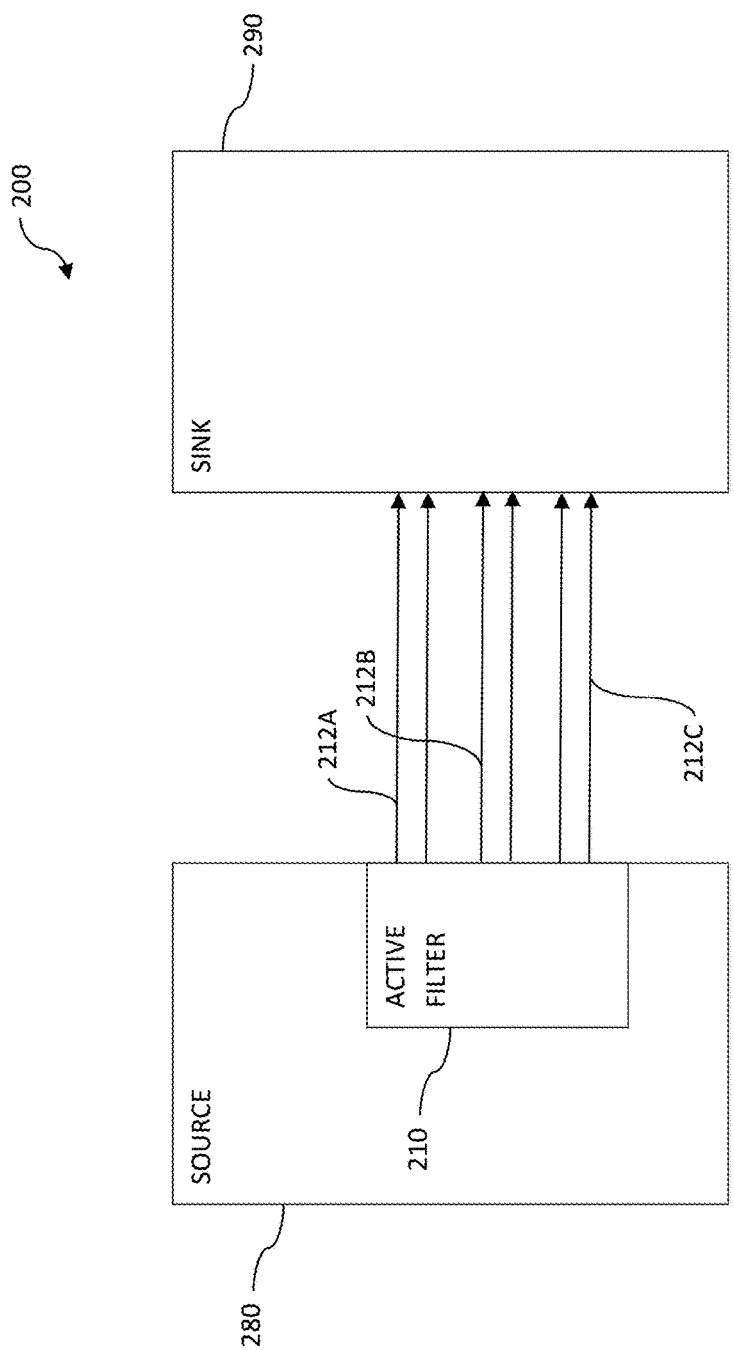
FIG. 2A is a graphical representation of an exemplary multimedia system used in accordance with the principles of the present disclosure.

Referring now to FIG. 2A, an exemplary multimedia system 200 is illustrated which may include a source device 280 and a sink device 290. The source device 280 may transmit A/V data transmitted over an HDMI cable; while the sink device 290 may receive (consume) the A/V data transmitted by the source device 280. The source device 280 may include an active filter 210 that is used to reduce EMI emissions for data transmitted across the TMDS data channels 212A, 212B, 212C. Additionally, and although not shown, the remaining pins of the HDMI connection as described supra may also establish communication links between the source device 280 and sink device 290.

Figure 2B:
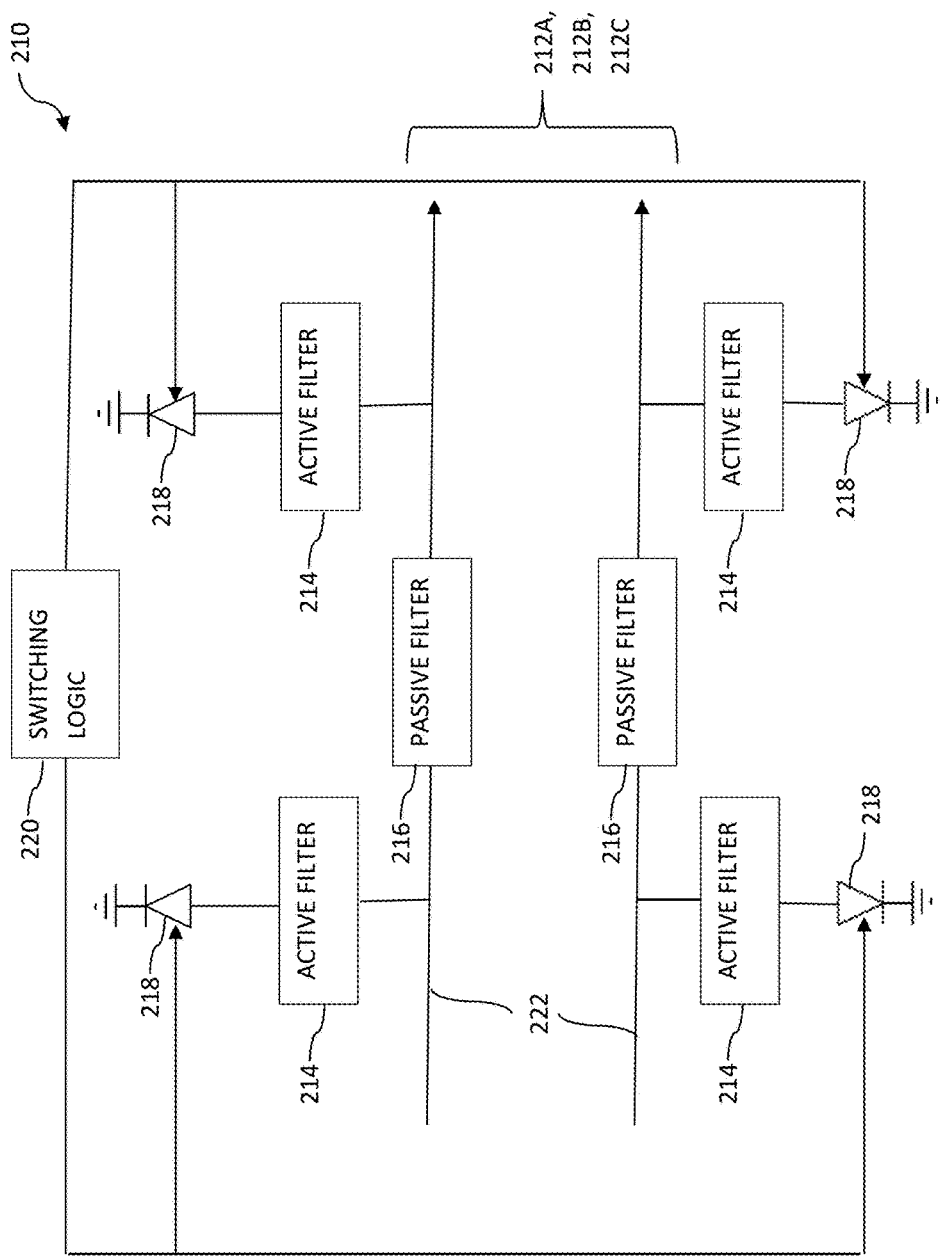
FIG. 2B is a graphical representation of an exemplary generalized filtering topology useful with the exemplary multimedia system of FIG. 2A in accordance with the principles of the present disclosure.

Referring now to FIG. 2B, a generalized active filter circuit 210 is shown and described in detail. While only a single active filter circuit 210 is shown in FIG. 2B (e.g., for TMDS data channel 212A), it will be readily appreciated that a given interface (e.g., an HDMI interface) may include three (3) of these active filter circuits 210. For example, in the context of an HDMI interface, one active filter circuit 210 may be present for each of the TMDS data channels 212A, 212B, 212C. Additionally, each of the TMDS data channels 212A, 212B, 212C may consist of two (2) distinct transmission lines 222. The active filter circuit 210 may include two (2) passive filter circuits 216 (e.g., second filter circuits). In some implementations, each of the passive filter circuits 216 may consist of substantially identical filtering circuitry. As used in the present context, the term "substantially identical" refers to the fact that due to manufacturing tolerances and/or variations in which these, for example, passive filter circuits 216 are manufactured, the exact impedance for each of these passive filter circuits may not be exactly identical to one another.

The active filter circuit 210 may also include four (4) active filter circuits 214 (e.g., first filter circuits). In the present context, the term "active filter circuit" refers to the fact that the signal conditioning functionality may be enabled/disabled via inclusion of diode circuitry 218. In some implementations, each of the four (4) active filter circuits 214 may be substantially identical to one another; or alternatively, one or more of the active filter circuits 214 may be substantially different from other one(s) of the active filter circuits 214. As previously alluded to, each of the active filter circuits 214 may be disposed between a respective transmission line 222 and a respective diode 218 coupled to ground. Switching logic 220 may be coupled to each of the respective diodes 218 and may be further configured to selectively activate/deactivate each of the diodes 218. For example, if switching logic 220 turns on the diodes 218, each of the active filter circuits 214 will be coupled to ground, thereby enabling the signal conditioning functionality for the active filter circuitry. Alternatively, if switching logic 220 turns off the diodes 218, each of the active filter circuits 214 may instead be "floating", thereby removing the signal conditioning functionality for these active filter circuits from the active filter circuit.

As a brief aside, the active filter circuit 210 topology illustrated in FIG. 2B may operate according to two (2)

different states. One state for the active filter circuit when the diodes are enabled and one state for the active filter circuit when the diodes are disabled. However, it is appreciated that additional active circuits 214 with accompanying diodes 218 may be included in alternative implementations. Such configurations may increase the number of states for the active filter circuit topology. For example, in instances where two (2) sets of active filter circuits 214 are present, the active filter circuit 210 topology may have three distinct sets of operative states. For example, one state may include an operative state where none of the diodes are enabled; another state may include an operative state where one of the two sets of active filter circuits 214 are enabled through the activation of diodes 218; while a third state may include an operative state where both sets of the active filter circuits 214 are enabled through the activation of diodes 218. These and other variants (e.g., that include three (3) or more sets of active filter circuits 214) would be readily apparent to one of ordinary skill given the contents of the present disclosure.

Methods

Figure 3:
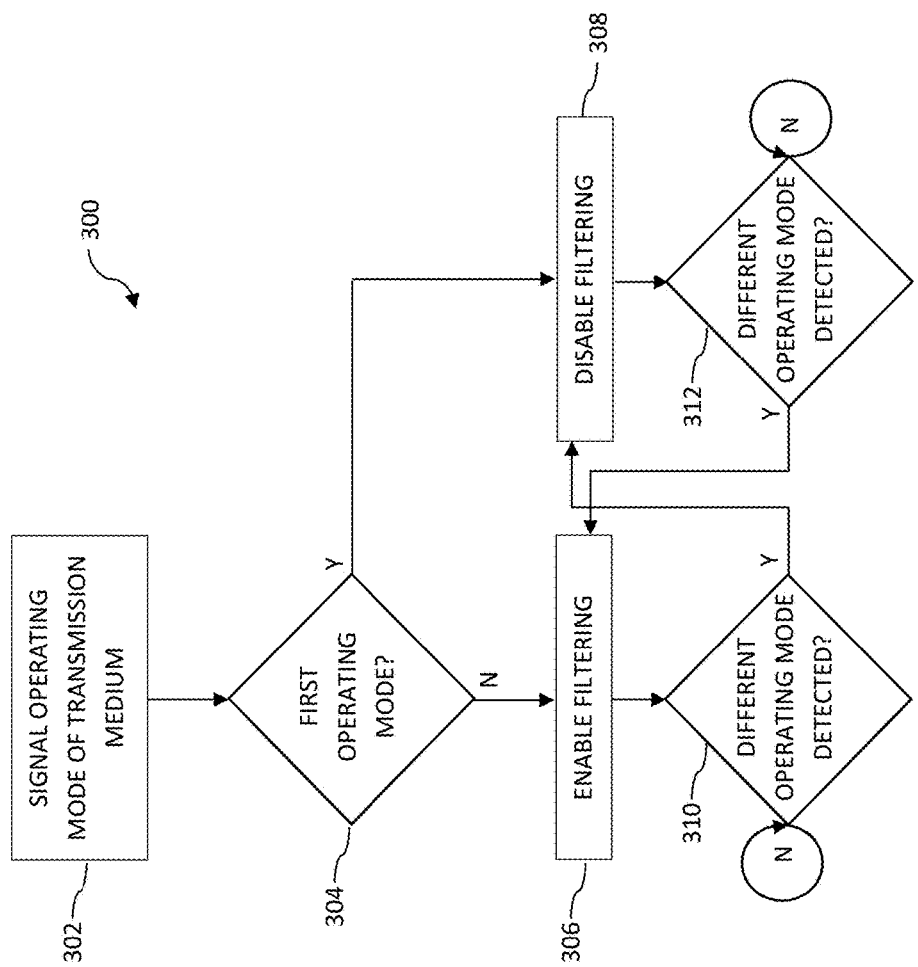
FIG. 3 is a logical flow diagram illustrating a generalized method for operating the exemplary generalized filtering topology of FIG. 2B in accordance with the principles of the present disclosure.

Referring now to FIG. 3, a generalized methodology 300 for operating an active filter circuit, such as without limitation, the generalized active filter circuit 210 shown in FIG. 2B, is shown and described in detail.

At operation 302, the operational mode of a transmission medium is signaled. In some implementations, and in the context of an exemplary HDMI system, the operational mode is signaled from the sink device 290 to the source device 280. Specifically, the video format(s) supported by the sink device 290 are determined through the parsing of the Extended Display Identification Data (EDID) data structure provided from, for example, a digital display device (e.g., an HDMI capable television display). For example, the sink device 290 may signal to the source device 280 that the sink device is capable of receiving video content at a resolution of 1080p and at a frame rate of 60 frames per second. As but another example, the sink device 290 may signal to the source device 280 that the sink device is capable of receiving video content at a 4K resolution (e.g., 3,840×2,160 pixels; 3,840×1,600 pixels; 4,096×2,160 pixels; or other various 4K resolution formats) at, for example, a frame rate of up to 120 frames per second. In alternative implementations, the device that provides the video content may signal to the display device the types of video content that the device that provides the video content may have available for transmission. These and other implementations would be readily apparent to one of ordinary skill given the contents of the present disclosure.

At operation 304, the source device 280 capable of providing content determines whether a first operational mode is supported by the sink device 290 that is to receive the content. For example, and in the exemplary context of HDMI, the source device 280 determines whether the sink device supports the first operating mode. The first operating mode may consist of, for example, 4K resolution at an operating frequency from, for example, 60 to 120 frames per second. If the sink device 290 is not capable of supporting the 4K resolution, the source device 280 may determine that the sink device does not support the first operational mode and advances to operation 306, where the signal conditioning circuitry (e.g., through the use of diode(s)) of the active filter circuit is enabled. If, however, the sink device 290 is capable of supporting 4K resolution, the source device 280 may determine that the sink device 290 does support the first operation mode and advances to operation 308, where the signal conditioning circuitry (e.g., through the use of diode(s)) of the active filter circuit is disabled.

If the active filter circuit has its, for example, diode(s) turned on at operation 306, the device capable of providing content may subsequently determine that the types of content supported by the receiving device has changed at operation 310. For example, and in the exemplary context of HDMI, the source device 280 may determine that the sink device 290 may support a different operating mode. In some implementations, this detected change in operating mode may result from, for example, the source device 280 being connected to a different sink device 290. If the different operating mode is detected at operation 310, the diode(s) may be turned off at operation 308. In some implementations, this determination of different operating modes may be made at periodic time intervals. In some implementations, this determination of different operating modes may be made at the time that a different sink device 290 is coupled with the source device 280. These and other variants would be readily apparent to one of ordinary skill given the contents of the present disclosure.

If the active filter circuit has, for example, its diode(s) turned off at operation 308, the device capable of providing content may subsequently determine that the types of content supported by the receiving device has changed at operation 312. For example, and in the exemplary context of HDMI, the source device 280 may determine that the sink device 290 may support a different operating mode. In some implementations, this detected change in operating mode may result from, for example, the source device 280 being connected to a different sink device 290. If the different operating mode is detected at operation 312, the signal conditioning circuitry (e.g., through the use of diode(s)) may be enabled at operation 306. In some implementations, this determination of different operating modes may be made at periodic time intervals. In some implementations, this determination of different operating modes may be made at the time that a different sink device 290 is coupled with the source device 280. Upon entering either of operation 306 or operation 308, the methodology 300 may continue to monitor for changes in operational mode at operations 310, 312 and may advance to operations 306, 308 at other times. In this manner, the system of, for example, FIG. 2A (e.g., system 200) may readily adapt to the types of sink devices 290 coupled to the source device 280.

In some implementations, where multiple lanes are present that operate according to different speeds (e.g., a fast lane and a slow lane), the enabling/disabling of active filter circuits may differ between the multiple lanes. For example, the slow lane may enable active filter circuits, while the fast lane may disable active filter circuits. As but yet another example, the slow lane may disable active filter circuits, while the fast lane may disable active filter circuits. These and other variants would be readily apparent to one of ordinary skill given the contents of the present disclosure.

Example Operation

Figure 4A:
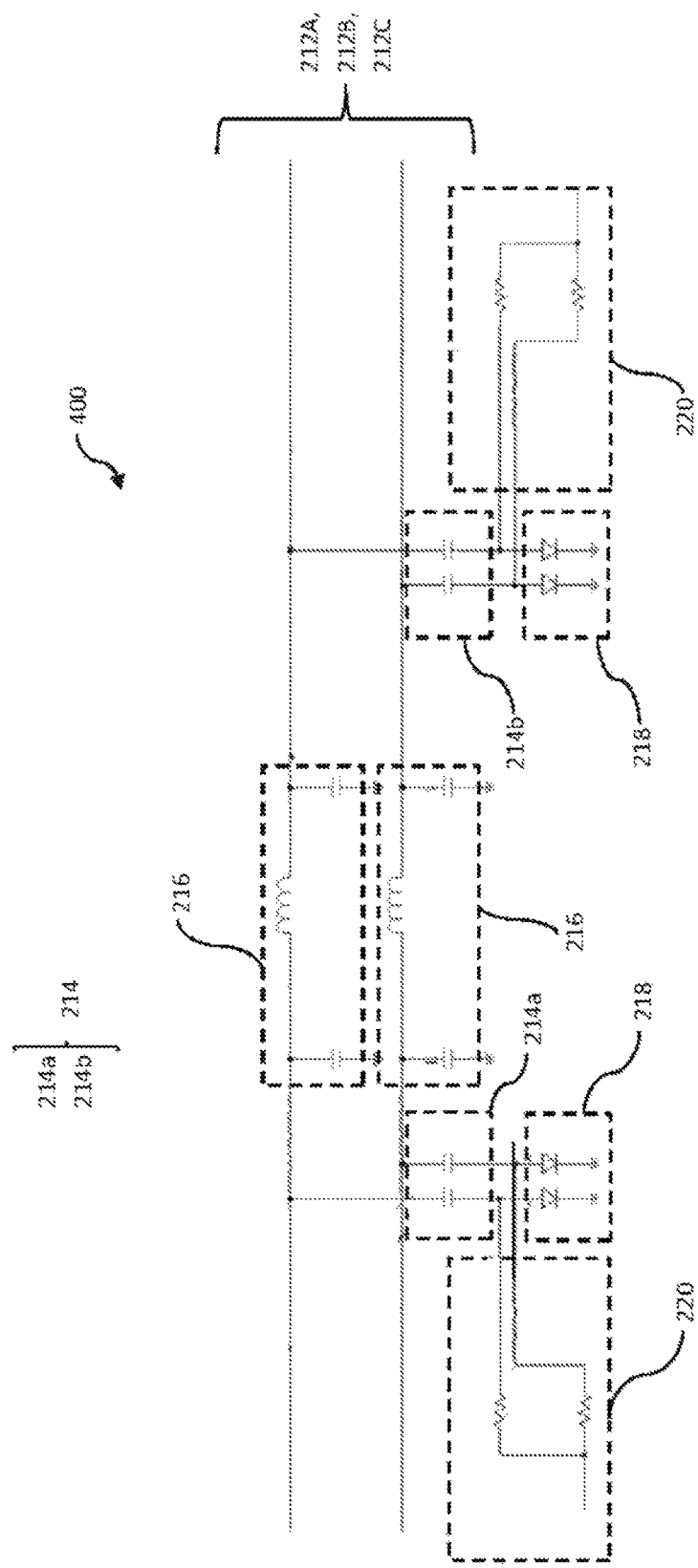
FIG. 4A is a graphical representation of a first exemplary filtering topology embodiment useful with the exemplary multimedia system of FIG. 2A in accordance with the principles of the present disclosure.

Referring now to FIG. 4A, a first exemplary filtering topology 400 is shown and described in detail. The filtering topology 400 illustrated is intended for use with each of the TMDS transmission lanes 212A, 212B, 212C. In other words, the filtering topology 400 may be repeated for each of the TMDS transmission lanes 212A, 212B, 212C in an exemplary HDMI system (such as system 200 illustrated in FIG. 2A). The passive filter circuits 216 may consist of a pi-network (π-network) that includes an inductive device coupled in series with both of the transmission lines for a given TMDS transmission lane, along with a capacitive device placed on either end of the inductive device with these capacitive devices being coupled to ground. As a brief aside, the use of the term π-network refers to the fact that this filter circuit resembles the symbol π (e.g., a capacitive-inductive-capacitive filter circuit). In some implementations of the passive filter circuit 216, the value of the inductors is 2.5 nH and the value of the capacitors is 0.2 pF. The active filter circuits 214 consist of a capacitor coupled between the transmission line 212A, 212B, 212C and a diode. In some implementations, the value for these capacitors is 4.0 pF for active filter circuit 214a and 3.0 pF for active filter circuit 214b. As previously alluded to, the activation of diodes 218 enables the active filter circuits 214 to become part of the filtering circuitry for the transmission lines 212A, 212B, 212C, while the disabling of the diodes 218 causes the active filter circuits to be removed as part of the filtering circuitry for the transmission lines 212A, 212B, 212C. The switching logic 220 may include two 1K ohm resistors that are coupled with a selectable voltage source. The switching logic may further include a processor apparatus or other hardware logic (e.g., an application-specific integrated circuit (ASIC)) and/or software logic configured to apply the selectable voltage.

Figure 4B:
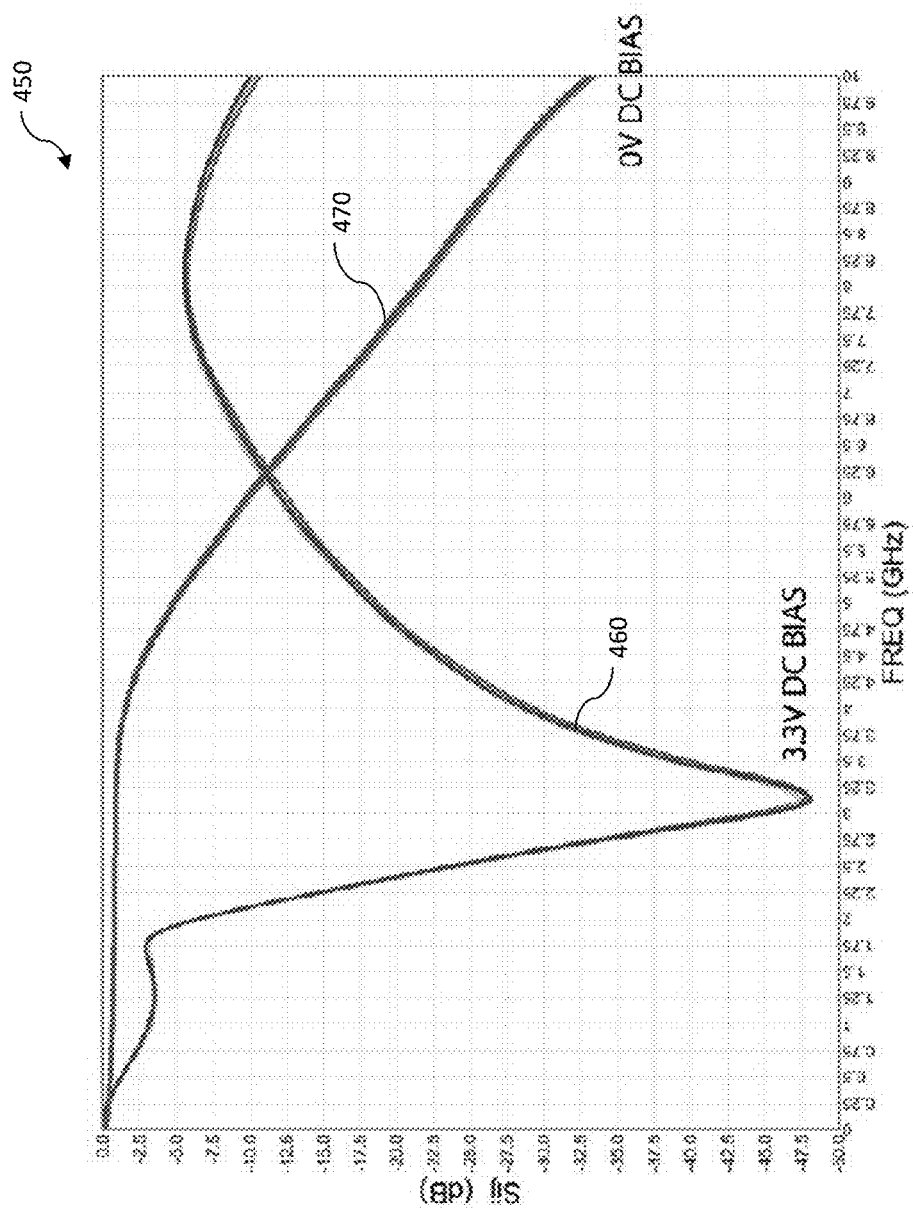
FIG. 4B is a plot of differential mode insertion loss as a function of frequency for the first exemplary filtering topology embodiment of FIG. 4A in accordance with the principles of the present disclosure.

Referring now to FIG. 4B, the differential mode insertion loss 450 of the first exemplary filtering topology 400 of FIG. 4A as a function of operating frequency is shown and described in detail. When the diodes 218 are enabled, via the application of a 3.3V DC bias as but one example, the filter 400 has a significant resonance at approximately 3 GHz, but does not have a significant attenuation prior to approximately 1.75 GHz. This frequency response is represented by curve 460. However, when the diodes 218 are disabled (i.e., with no application of voltage to the switching logic 220), there is no significant attenuation up to approximately 4.5 GHz with the resonance of the first exemplary filtering topology 400 now at a high frequency range that is outside of the frequency of interest (e.g., the frequency of interest for wireless devices that are co-located with the source device 280). This frequency response is represented by curve 470. In some implementations, the 3.3V DC bias is applied for an operating mode for legacy video content (e.g., 1080p content), while the 0V DC bias is applied for an operating mode for 4K video content. Table 1 reproduced infra illustrates exemplary average dB desense values at 2.4 GHz with and without the filtering topology 400 of FIG. 4A as a function of common HDMI cables available for purchase by consumers.

TABLE 1

| Cable | No filtering on HDMI data lines | | Filtering on HDMI data lines | |
|---|---|---|---|---|
| | 1080 p | 4k60 | 1080 p | 4k60 |
| Position A | | | | |
| Cable A | 0.5 dB | 1.9 dB | 0.4 dB | 1.5 dB |
| Cable B | 1.7 dB | 10.3 dB | 0.1 dB | 11.3 dB |
| Cable C | 3.4 dB | 14.8 dB | 0.5 dB | 21.1 dB |
| Cable D | 6.2 dB | 19.4 dB | 0.5 dB | 19.8 dB |
| Cable E | 14.0 dB | 26.2 dB | 1.5 dB | 28.6 dB |
| Cable F | 6.1 dB | 19.6 dB | 1.1 dB | 20.6 dB |
| Position B | | | | |
| Cable A | 0.2 dB | 0.1 dB | 0.5 dB | 0.3 dB |
| Cable B | 1.8 dB | 10.0 dB | 0.0 dB | 10.1 dB |
| Cable C | 4.9 dB | 16.8 dB | 0.5 dB | 20.4 dB |
| Cable D | 3.3 dB | 16.2 dB | 0.6 dB | 17.5 dB |
| Cable E | 9.6 dB | 23.0 dB | 0.8 dB | 23.2 dB |
| Cable F | 5.1 dB | 17.1 dB | 0.2 dB | 17.3 dB |

As can be seen from the above data illustrated in Table 1 reproduced supra, the use of the filtering topology 400 of FIG. 4A significantly improves upon performance in legacy operating modes (e.g., 1080p) at 2.4 GHz for many typical HDMI cables available for purchase by consumers.

Table 2 reproduced infra illustrates exemplary average dB desense values at 5 GHz with and without the filtering topology 400 of FIG. 4A as a function of common HDMI cables available for purchase by consumers.

TABLE 2

| Cable | No filtering on HDMI data lines | | Filtering on HDMI data lines | |
|---|---|---|---|---|
| | 1080 p | 4k60 | 1080 p | 4k60 |
| Position A | | | | |
| Cable A | 0.8 dB | 0.6 dB | 0.2 dB | 0.1 dB |
| Cable B | 2.0 dB | 1.5 dB | 0.2 dB | 0.5 dB |
| Cable D | 3.0 dB | 5.0 dB | 0.2 dB | 1.7 dB |
| Cable E | 10.0 dB | 6.0 dB | 0.6 dB | 3.5 dB |
| Position B | | | | |
| Cable A | 0.1 dB | 0.4 dB | 0.1 dB | 0.2 dB |
| Cable B | 6.0 dB | 4.0 dB | 0.1 dB | 0.2 dB |
| Cable D | 3.0 dB | 1.8 dB | 1.0 dB | 2.5 dB |
| Cable E | 8.5 dB | 9.0 dB | 1.3 dB | 3.0 dB |

As can be seen from the above data illustrated in Table 2 reproduced supra, the use of the filtering topology 400 of FIG. 4A significantly improves upon performance in both legacy operating modes (e.g., 1080p) and non-legacy operating modes (e.g., 4K) at 5 GHz for many typical HDMI cables available for purchase by consumers.

Figure 5A:
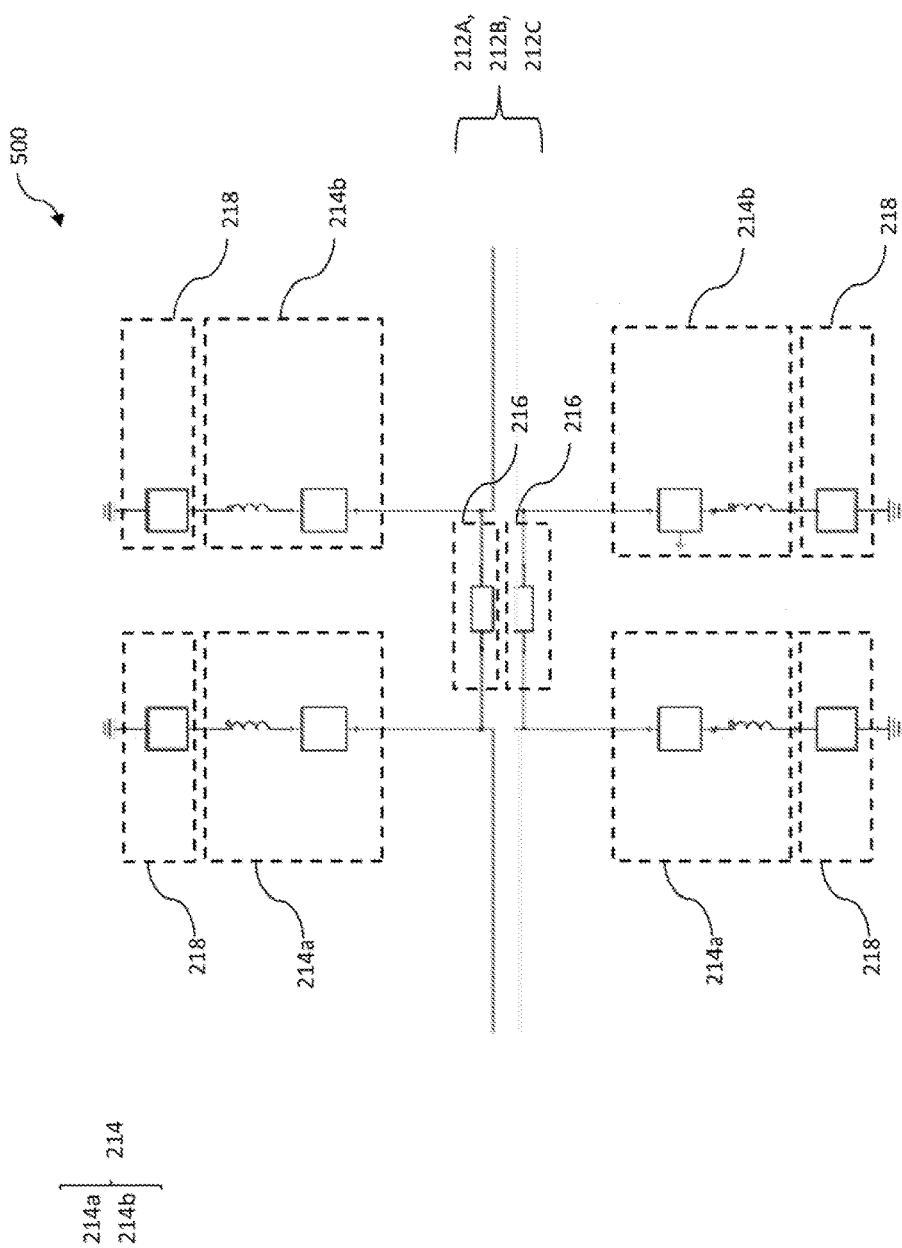
FIG. 5A is a graphical representation of a second exemplary filtering topology embodiment useful with the exemplary multimedia system of FIG. 2A in accordance with the principles of the present disclosure.

Referring now to FIG. 5A, a second exemplary filtering topology 500 is shown and described in detail. The filtering topology 500 illustrated is intended for use with each of the TMDS transmission lanes 212A, 212B, 212C. In other words, the filtering topology 500 may be repeated for each of the TMDS transmission lanes 212A, 212B, 212C in an exemplary HDMI system (such as system 200 illustrated in FIG. 2A). The passive filter circuits 216 may consist of length of printed circuit board trace between the active filter circuits 214a, 214b. In other words, these printed circuit board traces may act as parasitic inductors. In some implementations, this length of printed circuit board trace may vary between 0 mm and 10 mm, although it is appreciated that longer lengths of printed circuit board traces may be readily substituted in some implementations, dependent upon the specific requirements of the system (such as system 200 illustrated in FIG. 2A). For example, the length of the printed circuit board traces may, in addition to being constrained by parasitic inductance, be determined based on "time of flight" considerations, printed circuit board real estate considerations and the like. The active filter circuits 214 consists of a capacitor and inductor coupled in series between the transmission line 212A, 212B, 212C and a diode 218. In some implementations, the value for these capacitors is 1.0 pF and the value for these inductors is 4.24 nH for active filter circuit 214a, and the value for these capacitors is 1.0 pF and the value for these inductors is 0.3 nH for active filter circuit 214b. As previously alluded to, the activation of diodes 218 enables the active filter circuits 214 to become part of the filtering circuitry for the transmission lines 212A, 212B, 212C, while the disabling of the diodes 218 causes the active filter circuits 214 to be removed as part of the filtering circuitry for the transmission lines 212A, 212B, 212C. The switching logic (not shown) may be coupled with a selectable voltage source in order to activate/deactivate the diodes 218.

Figure 5B:
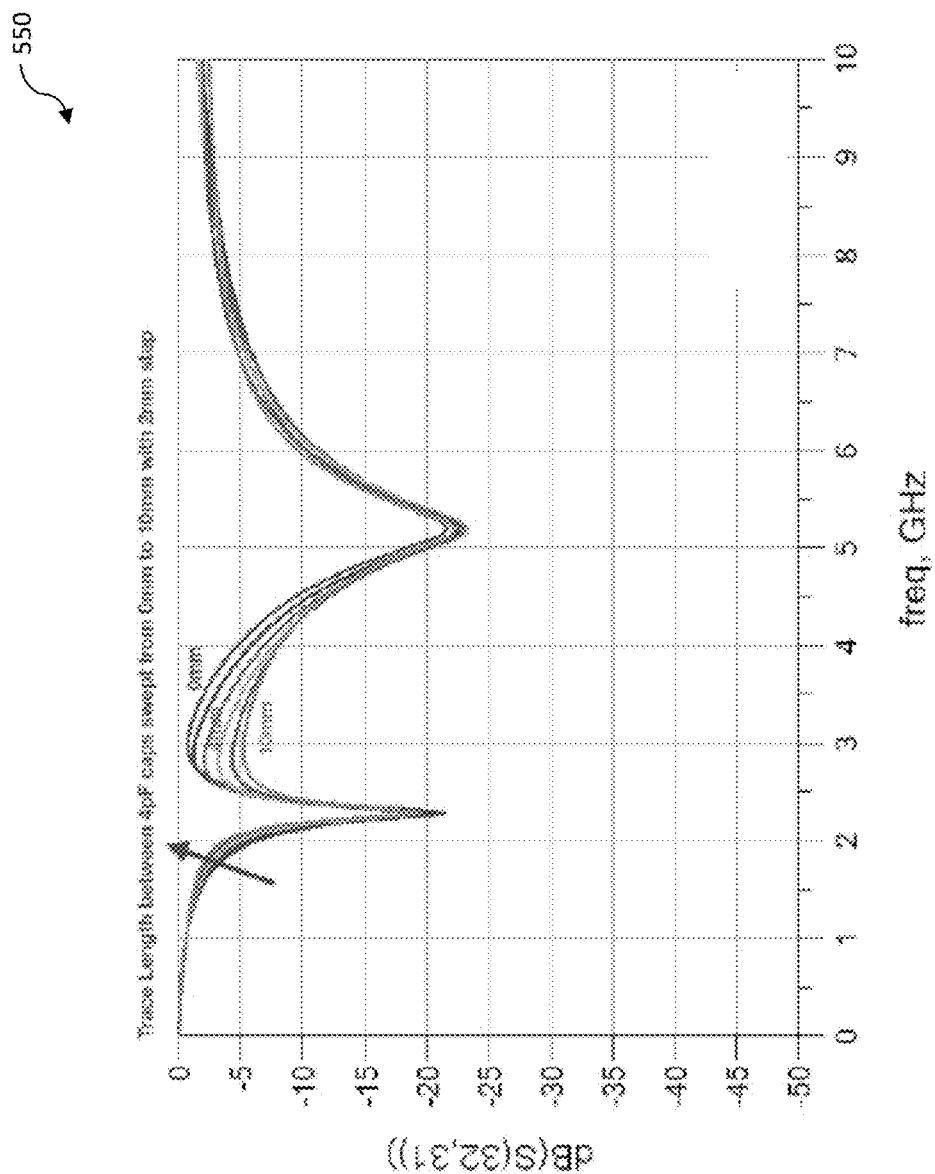
FIG. 5B is a plot of differential mode insertion loss as a function of frequency for the second exemplary filtering topology embodiment of FIG. 5A in accordance with the principles of the present disclosure.

Referring now to FIG. 5B, the differential mode insertion loss 550 of the second exemplary filtering topology 500 of FIG. 5A as a function of operating frequency is shown and described in detail. More specifically, curves are shown as a function of the length of the traces (e.g., passive filter circuits 216) is shown in 2 mm increments between 0 mm and 10 mm. When the diodes 218 are enabled, via the application of a 3.3V DC bias as but one example, the filter 500 acts as a dual notch filter with the dual notch filter targeting the frequency ranges from between 2400 MHz-2500 MHz and 5180 MHz-5825 MHz.

Figure 6A:
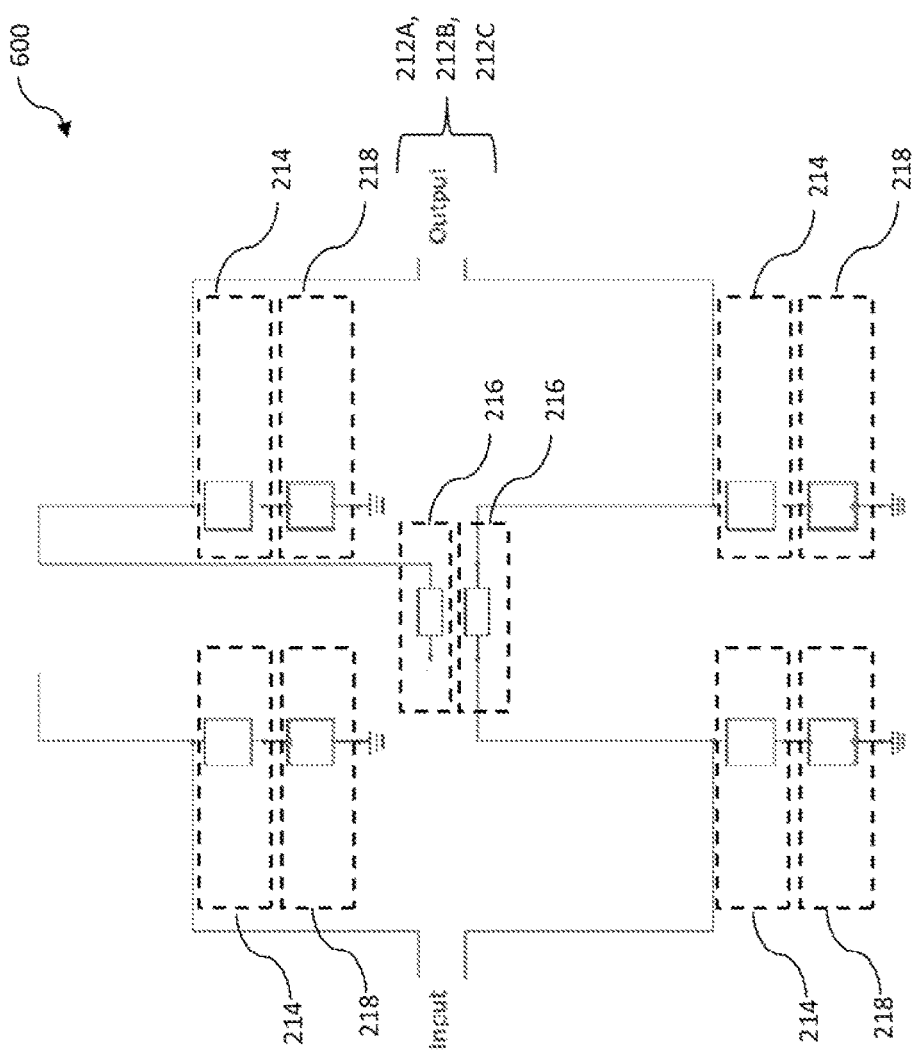
FIG. 6A is a graphical representation of a third exemplary filtering topology embodiment useful with the exemplary multimedia system of FIG. 2A in accordance with the principles of the present disclosure.
Figure 6B:
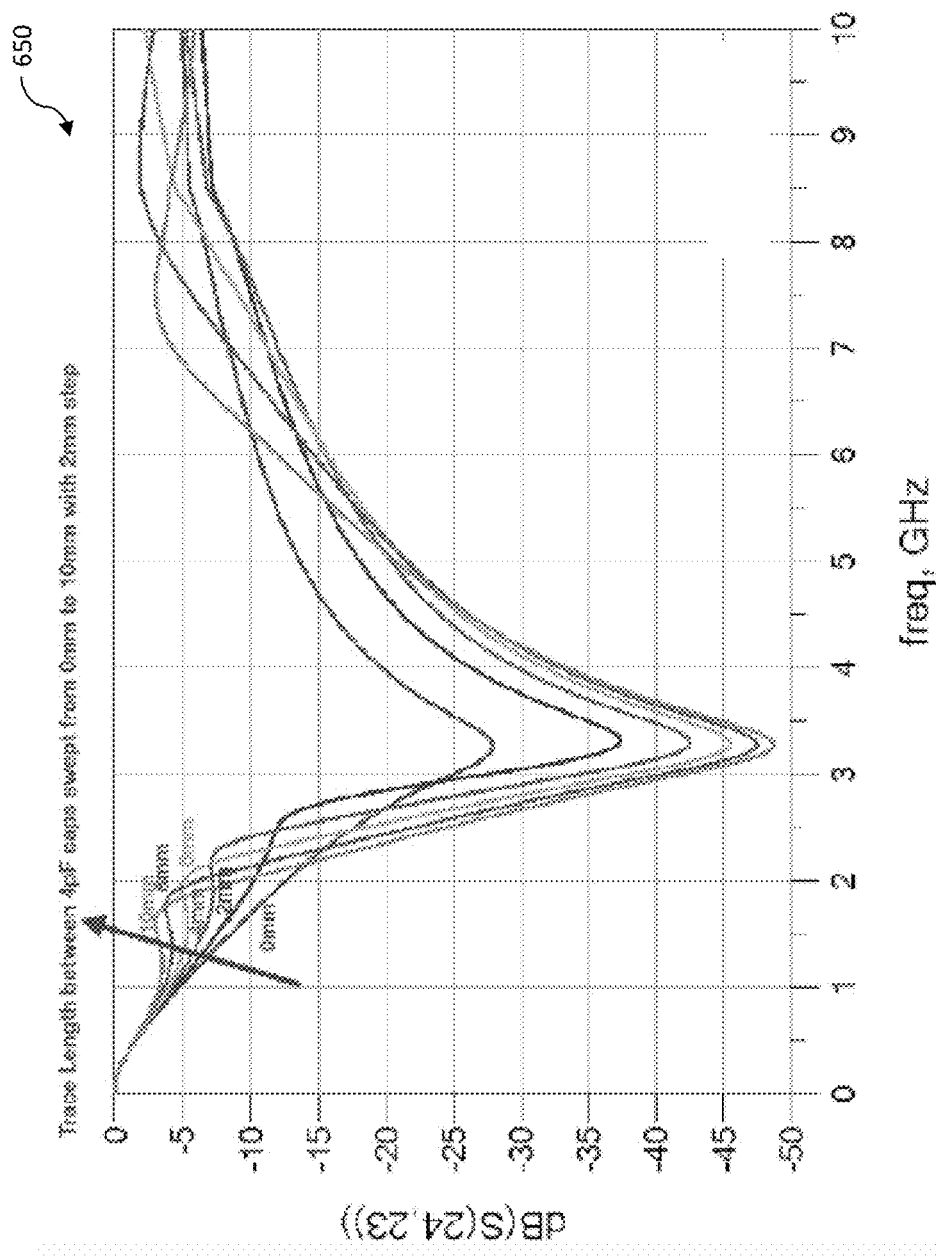
FIG. 6B is a plot of differential mode insertion loss as a function of frequency for the third exemplary filtering topology embodiment of FIG. 6A in accordance with the principles of the present disclosure.

Referring now to FIG. 6A, a third exemplary filtering topology 600 is shown and described in detail. The filtering topology 600 illustrated is intended for use with each of the TMDS transmission lanes 212A, 212B, 212C. In other words, the filtering topology 600 may be repeated for each of the TMDS transmission lanes 212A, 212B, 212C in an exemplary HDMI system (such as system 200 illustrated in FIG. 2A). The passive filter circuits 216 may consist of a length of printed circuit board trace between the active filter circuits 214. In some implementations, this length of printed circuit board trace may vary between 0 mm and 10 mm, although it is appreciated that longer lengths of printed circuit board traces may be readily substituted in some implementations, dependent upon the specific requirements of the system (such as system 200 illustrated in FIG. 2A). The active filter circuits 214 consists of a capacitor coupled in series between the transmission line 212A, 212B, 212C and a diode 218. In some implementations, the value for these capacitors is 4.0 pF for active filter circuit 214. The circuit topology 600 of FIG. 6A differs from that the topology 500 of FIG. 5A in that the series inductor has been replaced with a precise surface trace length. The benefit of removing the series inductor from the active filter circuitry coupled with the diodes 218 is that the circuit topology 600 may pass de-sense requirements in 4K resolutions. In addition, the circuit topology 600 of FIG. 6A may be utilized in conjunction with existing printed circuit board designs and may reduce 5 GHz desense performance when in, for example, an HDMI 2.0 mode of operation. As previously alluded to, the activation of diodes 218 enables the active filter circuits 214 to become part of the filtering circuitry for the transmission lines 212A, 212B, 212C, while the disabling of the diodes 218 causes the active filter circuits 214 to be removed as part of the filtering circuitry for the transmission lines 212A, 212B, 212C. The switching logic (not shown) may be coupled with a selectable voltage source in order to activate/deactivate the diodes 218. Referring now to FIG. 6B, the differential mode insertion loss 650 of the second exemplary filtering topology 600 of FIG. 6A when the diodes are enabled as a function of operating frequency is shown and described in detail. More specifically, curves are shown as a function of the length of the traces (e.g., passive filter circuits 216) is shown in 2 mm increments between 0 mm and 10 mm.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method of operating a source device in an HDMI system, the method comprising:
   receiving an operating mode for a sink device coupled to the source device;
   determining if a first operating mode is supported by the sink device, and if so, turning off one or more diodes present in an active filter circuit, otherwise if the first operating mode is not supported, turning on the one or more diodes present in the active filter circuit.

2. The method of claim 1, wherein when the first operating mode is supported by the sink device, the method further comprises detecting a different operating mode of operation and turning on the one or more diodes present in the active filter circuit.

3. The method of claim 1, wherein when the first operating mode is not supported by the sink device, the method further comprises detecting a different operating mode of operation and turning off the one or more diodes present in the active filter circuit.

4. The method of claim 1, wherein the turning on the one or more diodes comprises enabling active filter circuitry present within the active filter circuit.

5. The method of claim 1, wherein the turning off the one or more diodes comprises disabling active filter circuitry present within the active filter circuit.

6. An HDMI source device, comprising:
   a wireless interface; and
   an HDMI interface coupled with an active filter circuit topology, the active filter circuit topology comprising:
     a pair of differential signal lanes;
     a passive filter circuit disposed within each of the pair of differential signal lanes;
     a plurality of active filter circuits, with at least a first active filter circuit disposed on one side of the passive filter circuit and at least a second active filter circuit disposed on the other side of the passive filter circuit;
     a plurality of diodes, with each of the plurality of active filter circuits coupled with a respective diode; and
     switching logic coupled with the plurality of diodes.

7. The HDMI source device of claim 6, wherein the passive filter circuit comprises a π-network circuit topology.

8. The HDMI source device of claim 7, wherein each of the plurality of active filter circuits comprises a capacitor.

9. The HDMI source device of claim 8, wherein the switching logic is configured to receive operating mode data from a sink device coupled to the HDMI source device, the switching logic further configured to selectively apply a voltage to the plurality of diodes dependent upon the received operating mode data.

10. The HDMI source device of claim 6, wherein the passive filter circuit comprises a length of a printed circuit board trace.

11. The HDMI source device of claim 10, wherein each of the plurality of active filter circuits comprises a capacitor coupled in series with an inductor.

12. The HDMI source device of claim 11, wherein the switching logic is configured to receive operating mode data from a sink device coupled to the HDMI source device, the switching logic further configured to selectively apply a voltage to the plurality of diodes dependent upon the received operating mode data.

13. The HDMI source device of claim 11, wherein an inductive value differs between the at least the first active filter circuit and the at least the second active filter circuit.

14. The HDMI source device of claim 10, wherein each of the plurality of active filter circuits comprises a capacitor with a capacitance value that differs between the at least the first active filter circuit and the at least the second active filter circuit.

15. The HDMI source device of claim 14, wherein the switching logic is configured to receive operating mode data from a sink device coupled to the HDMI source device, the switching logic further configured to selectively apply a voltage to the plurality of diodes dependent upon the received operating mode data.

16. An HDMI system, comprising:
a sink device; and
a source device coupled to the sink device via an HDMI cable;
wherein the source device comprises an active filter circuit, the active filter circuit configured to alter a signal conditioning function dependent upon operating mode signaling provided by the sink device to the source device.

17. The HDMI system of claim 16, wherein the operating mode signaling comprises an Extended Display Identification Data (EDID) data structure that is transmitted across the HDMI cable.

18. The HDMI system of claim 17, wherein the active filter circuit further comprises a plurality of diodes, the plurality of diodes are configured to be selectively activated via switching logic, the selective activation being dependent upon the EDID data structure that is transmitted across the HDMI cable.

19. The HDMI system of claim 16, wherein the active filter circuit comprises:
a pair of differential signal lanes;
a passive filter circuit disposed within each of the pair of differential signal lanes;
a plurality of active filter circuits, with at least a first active filter circuit disposed on one side of the passive filter circuit and at least a second active filter circuit disposed on the other side of the passive filter circuit;
a plurality of diodes, with each of the plurality of active filter circuits coupled with a respective diode; and
switching logic coupled with the plurality of diodes.

20. The HDMI source device of claim 19, wherein the switching logic is configured to receive the operating mode signaling from the sink device, the switching logic further configured to selectively apply a voltage to the plurality of diodes dependent upon the received operating mode signaling.

* * * * *